United States Patent [19]

Carter, Jr. et al.

[11] Patent Number: 4,460,733

[45] Date of Patent: Jul. 17, 1984

[54] POLYCARBONATE COMPOSITIONS HAVING LOW GLOSS VALUES

[75] Inventors: Russell P. Carter, Jr., New Martinsville, W. Va.; In C. Lim, Pittsburgh; Gerard E. Reinert, McMurray, both of Pa.

[73] Assignee: Mobay Chemical Corporation, Pittsburgh, Pa.

[21] Appl. No.: 445,317

[22] Filed: Nov. 29, 1982

[51] Int. Cl.$^3$ .............................................. C08K 3/36
[52] U.S. Cl. .................................... 524/493; 524/611
[58] Field of Search ......................... 524/492, 493, 611

[56] References Cited

U.S. PATENT DOCUMENTS

| | | | |
|---|---|---|---|
| 3,359,238 | 12/1967 | Goldberg et al. | 260/47 |
| 3,360,498 | 12/1967 | Rawlings | 260/15.7 |
| 4,065,401 | 12/1977 | Cohnen et al. | 252/350 |
| 4,110,273 | 8/1978 | Cohnen et al. | 521/59 |
| 4,384,067 | 5/1983 | Rawlings et al. | 524/493 |

FOREIGN PATENT DOCUMENTS

| | | | |
|---|---|---|---|
| 0066772 | 12/1982 | European Pat. Off. | 524/611 |
| 2324427 | 11/1980 | Fed. Rep. of Germany . | |
| 1069752 | 5/1967 | United Kingdom . | |
| 1237164 | 6/1971 | United Kingdom . | |

OTHER PUBLICATIONS

Min-u-sil Powder Coating Fillers; Epoxy and Polyester Powders, PGS a Subsidiary of ITT, No. 2072-SM9-76-CL.
TS 100, Flatting Agent, Degussa PT 47-2-3-977.
Technical Bulletin Pigments, Synthetic Silica Auxilaries for the Plastics Industry, Degussa, Pig 13-4-4-779 DD, Jul. 1979.
The Family of Syloid Silicas; Grace, Davison Chemical Division; PA-59-280.
Min-u-sil & Supersil Fillers for Adhesives & Sealants, PGS, a Subsidiary of ITT; 2055-5M1079-CL.
Min-u-sil, Micron-sized Silica Multi-Purpose Filler and Extender, PGS, a Subsidiary of ITT, 2073-SM9-78-CL.
Min-u-sil, PGS, Floridin, a Member of ITT System 2059-5M 1179 CL., p. 610 of 4th Ed Hackh's.

*Primary Examiner*—Lewis T. Jacobs
*Attorney, Agent, or Firm*—Gene Harsh; Lawrence S. Pope; Aron Preis

[57] ABSTRACT

The present invention is directed to a polycarbonate composition comprising finely divided silica which composition is characterized by low gloss.

3 Claims, No Drawings

POLYCARBONATE COMPOSITIONS HAVING LOW GLOSS VALUES

FIELD OF THE INVENTION

The invention is directed to polycarbonates and more particularly to a composition comprising a polycarbonate resin and silica.

SUMMARY OF THE INVENTION

The invention concerns polycarbonate compositions characterized by their low gloss, which compositions comprise a polycarbonate resin and a particular finely divided silica having a certain specific surface value.

BACKGROUND OF THE INVENTION

Polycarbonates derived from reactions involving organic dihydroxy compounds and carbonic acid derivatives have found extensive commercial application because of their excellent mechanical and physical properties. These thermoplastic materials are particularly suited for the manufacture of molded products where impact strength, rigidity, toughness, thermal and dimensional stability as well as excellent electrical properties are required.

In some applications, however, notably power tool housing and business machine enclosures, low gloss is a design requirement limiting the use of polycarbonate resins. Opaque polycarbonate resins exhibit high gloss (60° gloss 100 to 103%) which to a degree is dependent on the molding conditions.

Polycarbonate compositions containing silica have been disclosed in the past. The art is indicated to include U.S. Pat. No. 3,424,703 where the addition of silica is reported to bring about a lowered coefficient of static friction for polycarbonate films and U.S. Pat. No. 3,903,224 wherein disclosed is the preparation of structural polycarbonate foam articles containing silicon dioxide. Improved color homogeneity in polycarbonate as achieved by the use of silica is reported in U.S. Pat. No. 4,049,614. Novaculite, which is a form of silica, is reported in U.S. Pat. No. 4,070,330 to improve the impact strength of polycarbonate, and U.S. Pat. No. 3,933,730 is noted to disclose polycarbonate compositions entailing silica and a particular gum characterized by its improved thermal stability.

Also noted in the art is U.S. Pat. No. 3,396,046 which discloses silica as a component of a surface treatment to polycarbonates, which treatment is aimed at promoting the adhesion of a coating thereon. Further, U.S. Pat. No. 3,751,326 discloses a hard, abrasion resistant resin containing silica and U.S. Pat. No. 4,045,403 describes a method for compounding thermoplastic polymers including particulate additives. U.K. Patent No. 1,441,367 is noted to disclose a polycarbonate composition containing hydrophobic quartz characterized by its level of mechanical properties.

In accordance with the present invention a silica filled thermoplastic polycarbonate composition is provided, characterized by its reduced gloss and the substantial retention of its physical and mechanical properties.

DETAILED DESCRIPTION OF THE INVENTION

When used herein "polycarbonate resin" means the neat resin without additives; "polycarbonate" means both the formulated polycarbonate resin with additives therein and also the final molded plastic product. The polycarbonate resins useful in the practice of the invention are homopolycarbonate, copolycarbonate and terpolycarbonate resins or mixtures thereof. The polycarbonate resins generally have molecular weights of 10,000–200,000 (weight average molecular weight) preferably 20,000–80,000, and are additionally characterized by their melt flow of 1–24 gm/10 min. at 300° C. per ASTM D-1238. These polycarbonates may be prepared, for example, by the known diphasic interface process from phosgene and bisphenols by polycondensation (see German OS Nos. 2,063,050; 2,053,052; 1,570,703; 2,211,956; 2,211,957 and 2,248,817 and French Patent No. 1,561,518 and the monograph, H. Schnell, *Chemistry and Physics of Polycarbonates,* Interscience Publishers, New York, 1964, all incorporated herein by reference).

In the present context, bisphenols suitable for the preparation of the polycarbonates of the invention conform to the structural formulae (1) or (2)

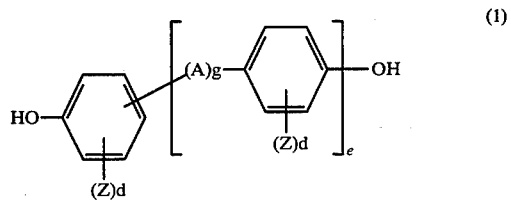

(1)

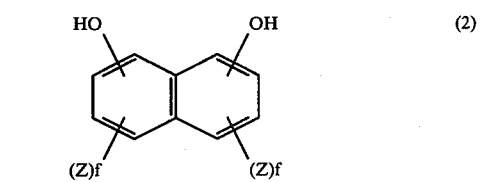

(2)

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or —SO$_2$— radical; a radical of the general formula

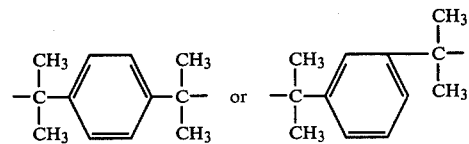

g denotes the number 0 or 1;
e denotes the number 0 or 1;
Z denotes F, Cl, Br or a C$_1$–C$_2$ alkyl and if several Z radicals are substituents in one aryl radical, they may be identical or different;
d denotes 0 or an integer of from 1 to 4; and
f denotes 0 or an integer of from 1 to 3.

Among the useful bisphenols in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropyl-benzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French patent specification No. 1,561,418 and in the monograph, H. Schnell, *Chemistry and Physics of Polycarbonates,* Interscience Publishers, New York, 1964. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenol.

The most preferred bisphenol is 2,2-bis-(4-hydroxyphenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Patents Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention monofunctional reactants such as monophenols may be used in order to limit their respective molecular weights. Also, branching agents may be employed. Branching may be obtained by the incorporation of small amounts, preferably of between about 0.05 and 2.0 mol % (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347; British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4-6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxy-triphenyl)-methyl) benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

Among the resins suitable in the practice of the invention are included phenolphthalic-based polycarbonate, copolycarbonates and terpolycarbonates such as are described in U.S. Pat. Nos. 3,036,036 and 4,210,741, both incorporated by reference herein.

The silica useful in the context of the present invention is characterized in that its average particle size is from about 1 to about 9.5 microns, preferably between about 1.9 to about 8.8 microns and in that its specific surface area is between about 2.2 to about 0.45 m$^2$/gm, preferably 2.06 to about 0.54 m$^2$/gm. While not offered as an explanation to the findings reported presently, the inventors noted that the reduction in gloss in the resins of the invention results upon the use in accordance with the invention of silica particles as described above, where the particles are characterized by their fine particle size and low specific surface area.

A preferred silica in the practice of the invention may be characterized by its chemical and physical properties as noted below.

| | |
|---|---|
| Silicon Dioxide (SiO$_2$) | 99.70% |
| Iron Oxide (Fe$_2$O$_3$) | 0.023% |
| Aluminum Oxide (Al$_2$O$_3$) | 0.101% |
| Titanium Dioxide (TiO$_2$) | 0.019% |
| Calcium Oxide (CaO) | Trace |
| Magnesium Oxide (MgO) | Trace |
| Loss on Ignition at 1200° F. | 0.145 |
| Specific Gravity | 2.650 |
| Refractive Index | 1.547 |
| pH | 7.0 |
| Porosity | Non-porous |
| Bulking Value | 22.144 lb./gal. |
| | 0.04522 gal./lb. |
| Surface Area | 0.54 to 2.06 m$^2$/gm. |

A certain such silica, available in commerce as Min-U-Sil from PGS Division of ITT is characterized further below.

| | |
|---|---|
| Surface Area, m$^2$/gm | 0.54–2.06 |
| Avg. Particle Size, Microns | 8.8–1.9 |
| Fineness of Grind-Hegman (ASTM D1210) | 5.0–7.5 |
| Grade Bulk Density, lb./gal. | 8.423–5.442 |
| Apparent Bulk Density, lb./ft.$^3$ | 63.0–40.7 |
| Oil Absorption, lbs. of Oil/100 lbs. Min-U-Sil (Gardner-Coleman ASTM D1483) | 26.5–47.5 |
| Oil Absorption, lbs. of Oil/100 lbs. Min-U-Sil (Spatula Rub-Out ASTM D281) | 24.1–36.2 |
| Water Absorption, lbs. of Water/100 lbs. Min-U-Sil (Spatula Rub-Out Basis ASTM 281) | 32.5–43.5 |
| Dry Color (Green Filter Reflectance) | 90.5–90 |

In the carrying out of the experimental work reported here, the materials used are described as follows:

TS 100 is Flatting Agent TS 100, described as a pure silica having an agglomerate particle size of 2–10 micrometers, available commercially from Degussa, Frankfurt, FDR.

Aerosil 200 is silica obtained by a pyrogenic process, characterized in that its BET determined specific surface is about 200±15 m$^2$/gm and is a product of Degussa.

Syloid 221 and Syloid 74, both are silicas available from W.R. Grace & Co., Baltimore, Md.

Satintone Special (clay) is a calcined aluminum silicate having a specific surface of about 10–12 m$^2$/gm and is a product of Engelhard Corporation of Edison, N.J.

Merlon 5400 is a BPA-based polycarbonate homopolymer having a melt flow rate per ASTM D1238 condition 0, of about 12-24 g/10 min., available from Mobay Chemical Corporation.

Merlon M-40 and M-50, respectively, are BPA-based homopolycarbonates characterized in that their melt flow indices respectively are 6-11.9 and 3.0-5.9 gm/10 min., in accordance with ASTM D1238, condition 0.

Acryloid KM-330 is an interpolymeric composite having a butylacrylate rubbery core and a rigid methacrylate shell, available from Rohm & Haas, Philadelphia, Pa.

Irganox 1076 is an antioxidant from Ciba-Geigy.

Min-U-Sil is silica available from PGS Floridin, a subsidiary of ITT, and is characterized by its specific area which is about 0.5 to about 2.1 m²/gm.

ASTM D528, standard Method of Test for specular gloss outlines in detail the procedure used to determine the 60 degree gloss and is incorporated herein by reference. The gloss measurements were obtained using a 60° Pocket Glossmeter "Mini-Gloss", an instrument for the photoelectrical measurement of light reflected directly from a surface, produced and available from Paul N. Gardner Company.

Specific surface area reported here, a material parameter characterizing the silica of the invention is determined by the method known as BET.

The compositions of the invention comprising about 0.6 to about 10.0, preferably 0.9 to about 5.0 percent of silica, the percentages being relative to the weight of the composition may contain other additives known in the art for their particular utility in polycarbonate technology. These include pigments, dyes, fillers, reinforcing agents, UV stabilizers and hydrolysis stabilizers as well as mold release agents, flame retardants of various types and impact modifiers.

The preparation of the compositions of the invention and the novel articles made therefrom, characterized in their reduced gloss are prepared in accordance with conventional procedures commonly used for the preparation of mineral filled polycarbonate resins.

The following examples will further illustrate the invention and are not to be construed as in anyway limiting thereof.

EXAMPLES

Example 1

The compositions described below were prepared and their properties determined. All comprised Merlon M-40, a homopolycarbonate resin characterized by its melt flow rate of 6 to 11.9 gm/10 min. per ASTM D1238, condition 0, 2 percent of Merlon 5400, and 1% of TiO₂. The control composition (M-40, Merlon 5400 and TiO₂) was evaluated as shown below.

TABLE 1

|  | Control | Min-U-Sil 5 | | Min-U-Sil 10 | | Min-U-Sil 30 | | Clay | |
| --- | --- | --- | --- | --- | --- | --- | --- | --- | --- |
| Additive (%) | — | 0.5 | 1.0 | 0.5 | 1.0 | 0.5 | 1.0 | 0.5 | 1.0 |
| Gloss | 103.4 | 101.2 | 97.4 | 99.7 | 93.9 | 101.2 | 93.7 | 102.1 | 99.6 |
| Gardner Impact in./lbs. | 440 | 485 | 437 | 438 | 419 | 417 | 448 | 488 | 341 |
| Notched Izod Impact (⅛") J/m | 894 | 191 | 174 | 135 | 154 | 147 | 127 | 581 | 177 |
| ft-lb/in. | 16.8 | 3.6 | 3.3 | 2.5 | 2.9 | 2.8 | 2.4 | 10.9 | 3.3 |
| Melt Flow Rate g/10 min. | | | | | | | | | |
| before molding | 7.4 | | | 7.6 | | 7.7 | | | |
| after molding | 7.5 | | | 7.8 | | 8.1 | | | |

Min-U-Sil 5, 10, 15 and 30 are characterized in that their respective specific surface values are 2.06, 1.1, 0.84 and 0.54 m²/gm.

Similar compositions containing, instead of Min-U-Sil or clay, any of TS 100, Aerosil 200, Syloid 74 or Syloid 221, were noted to exhibit a low level of gloss accompanied however by splay.

EXAMPLE 2

Composition in accordance with the invention comprising silica suitable for reduction of gloss and other additives notably Acryloid KM-330 were prepared and their properties determined as shown below. The addition of Acryloid KM-330 is indicated to reduce the notch sensitivity of polycarbonate resins. The compositions were based on Merlon M-40 to which added were 2 percent of Merlon 5400 and the indicated additives noted in Table 2. The percentages of the additives and of the silica are all relative to the weight of the composition.

TABLE 2

| | | | | | | | | | | | | | | | | |
| --- | --- | --- | --- | --- | --- | --- | --- | --- | --- | --- | --- | --- | --- | --- | --- | --- |
| TiO₂ (%) | 0 | 1 | 2 | 1 | 1 | 1 | 1 | 1 | 1 | 1 | 1 | 1 | 1 | 1 | 1 | 1 |
| Min-U-Sil 5 (%) | | | | 1 | 1 | | | | | | | | | | | |
| Min-U-Sil 10 (%) | 1 | | | | | 1 | 1 | 1 | 2 | 2 | 2 | | | | | |
| Min-U-Sil 15 (%) | | | | | | | | | | | | 1 | | | | |
| Min-U-Sil 30 (%) | | | | | | | | | | | | | 1 | 1 | 2 | 2 |
| Acryloid KM 330 (%) | | | | 2 | | | 2 | 3 | | 2 | 3 | | | 2 | | 3 |
| Irganox 1076 (%) | | | | 0.1 | | | 0.1 | 0.1 | | 0.1 | 0.1 | | | 0.1 | | 0.1 |
| PROPERTIES | | | | | | | | | | | | | | | | |
| Gloss, °60 (%) | 91.7 | 103.5 | 102.1 | 96.5 | 96.2 | 91.2 | 93.1 | 89.5 | 81.6 | 80.7 | 80.6 | 88.8 | 90.5 | 88.2 | 83.2 | 80.7 |
| Gardner Impact (in-lb) | 460 | 520 | 475 | 496 | 493 | 540 | 477 | 416 | 448 | 408 | 442 | 445 | 454 | 480 | 491 | 437 |
| Notched Izod Impact (⅛') (ft-lb/in) | 2.6 | 8.4 | 2.3 | 2.9 | 14.7 | 2.2 | 2.3 | 10.4 | 2.1 | 2.8 | 3.2 | | | | 2.0 | 3.1 |
| Density g/gm³ | 1.20 | 1.21 | 1.21 | 1.21 | 1.21 | 1.22 | 1.21 | 1.21 | 1.22 | 1.20 | 1.23 | | | | 1.22 | 1.21 |
| Deflection Temperature under load at 264 psi (°C.) | 135 | 124 | 130 | 125 | 126 | 129 | 129 | 127 | 128 | 128 | 129 | | | | 131 | 126 |
| Flexural Modulus (GPa) | 2.5 | 2.5 | 2.6 | 2.5 | 2.5 | 2.5 | 2.4 | 2.4 | 2.4 | 2.3 | 2.5 | | | | 2.5 | 2.4 |
| Flexural Stress at 5% | 103 | 95 | 100 | 95 | 93 | 95 | 92 | 92 | 93 | 90 | 94 | | | | 95 | 94 |

EXAMPLE 3

Compositions in accordance with the invention comprising silica suitable for reduced gloss as well as other additives were prepared and their properties determined. Table 3 summarizes the data obtained upon evaluating the compositions all of which were based on Merlon M-50 and all containing 2 phr of Merlon 5400. The amount of the additives are noted in percent relative to the weight of the compositions.

TABLE 3

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $TiO_2$ | | | | | 1 | 1 | 1 | 1 | 1 | 1 | 1 | 1 | 1 | 1 |
| Min-U-Sil 15 | 1 | | | | | 1 | 1 | 2 | 5 | | | 1 | 1 | 1 |
| Min-U-Sil 10 | | | 1 | 1 | | | | | | | | | | |
| Acryloid KM 330 | | 3 | 2 | 3 | | 3 | 4 | | | | 3 | | | |
| PROPERTIES | | | | | | | | | | | | | | |
| 60° Gloss (%) | 125.8 | 95 | 93 | 91 | 103.5 | 93.2 | 93.4 | 85.5 | 62.2 | 87.6 | 92.6 | 69.0 | 92.2 | 81.8 |
| Gardner Impact (in-lb) | 520 | 410 | 430 | 466 | 403 | 422 | 450 | 456 | 392 | 458 | 461 | 520 | 446 | 410 |
| Notched Izod Impact (⅛") (ft-lb/in.) | 17.7 | 14.9 | 15.0 | 15.6 | 18.8 | 14.1 | 13.8 | 2.9 | 2.3 | 16.7 | 16.7 | 3.3 | 3.4 | 3.2 |
| Tensile Stress at Break (PSI) | 10700 | 9600 | 10400 | 10500 | 9600 | 8700 | 7500 | 7500 | 7500 | 9700 | 8000 | 8900 | 8600 | 9900 |
| Tensile Strain at Break (%) | 120 | 103 | 118 | 122 | 108 | 48 | 133 | 45 | 38 | 105 | 73 | 100 | 73 | 113 |

Although the invention has been described with reference to specific materials, the invention is only to be limited so far as is set forth in the accompanying claims.

What is claimed is:

1. A thermoplastic molding composition comprising a polycarbonate resin and about 0.6 to about 10.0% of silica which is characterized in that its average particle size is from about 1 to about 9.5 microns and further in that its specific surface area is from about 2.2 to about 0.45 m²/g, said percentages being relative to the weight of said composition.

2. The composition of claim 1 wherein said silica is characterized in that its average particle size is between about 1.9 and about 8.8 microns and that its specific surface area is between about 2.06 to about 0.54 m²/g.

3. The composition of claim 2 wherein said amount of silica is between 0.9 and 5.0%.

* * * * *